(12) United States Patent
Kafader et al.

(10) Patent No.: US 10,860,907 B2
(45) Date of Patent: Dec. 8, 2020

(54) INFORMATION LINKING SYSTEM WITH GEO-LOCATION MECHANISM AND METHOD OF OPERATION THEREOF

(71) Applicant: StickEcodes Incorporated, Prescott Valley, AZ (US)

(72) Inventors: Lyle Phinney Kafader, Carlsbad, CA (US); Teresa Jean Mueller, Prescott Valley, AZ (US)

(73) Assignee: StickEcodes Incorporated, Prescott Valley, AZ (US)

( * ) Notice: Subject to any disclaimer, the term of this patent is extended or adjusted under 35 U.S.C. 154(b) by 213 days.

(21) Appl. No.: 15/905,233

(22) Filed: Feb. 26, 2018

(65) Prior Publication Data
US 2018/0247169 A1 Aug. 30, 2018

Related U.S. Application Data

(60) Provisional application No. 62/463,680, filed on Feb. 26, 2017.

(51) Int. Cl.
| | |
|---|---|
| *G06K 19/06* | (2006.01) |
| *H04W 4/18* | (2009.01) |
| *H04W 4/021* | (2018.01) |
| *G06F 21/62* | (2013.01) |
| *H04W 12/08* | (2009.01) |
| *H04W 12/04* | (2009.01) |
| *G06F 21/36* | (2013.01) |
| *G06K 7/14* | (2006.01) |

(Continued)

(52) U.S. Cl.
CPC ....... *G06K 19/06009* (2013.01); *G06F 21/36* (2013.01); *G06F 21/6209* (2013.01); *G06F 21/6218* (2013.01); *G06K 7/1413* (2013.01); *G06K 7/1417* (2013.01); *H04L 63/101* (2013.01); *H04W 4/021* (2013.01); *H04W 4/185* (2013.01); *H04W 12/04* (2013.01); *H04W 12/08* (2013.01); *G06F 2221/2111* (2013.01); *H04W 12/00503* (2019.01)

(58) Field of Classification Search
CPC ............................................... G06K 19/06009
See application file for complete search history.

(56) References Cited

U.S. PATENT DOCUMENTS

| | | | | |
|---|---|---|---|---|
| 3,705,294 A | * | 12/1972 | Kuehnle | .......... G06K 19/06009 235/487 |
| 6,819,409 B1 | * | 11/2004 | Tompkin | ............ G06K 7/10722 235/449 |

(Continued)

FOREIGN PATENT DOCUMENTS

EP 2821932 A1 1/2015

*Primary Examiner* — Simon P Kanaan
(74) *Attorney, Agent, or Firm* — Perspectives Law Group, Corp.

(57) ABSTRACT

A method of operation of an information linking system includes: scanning an identification icon on an object; determining an access key by analyzing the identification icon including a target location read from the identification icon and a current location of a device that scanned the identification icon; and retrieving at least an initial availability level from a plurality of qualified information levels of a geo-location object information and additional information levels, authorized by the access key when the current location is within a geo-fence of the target location, for displaying on the device.

20 Claims, 7 Drawing Sheets

(51) Int. Cl.
*H04L 29/06* (2006.01)
*H04W 12/00* (2009.01)

(56) References Cited

U.S. PATENT DOCUMENTS

| | | |
|---|---|---|
| 8,180,743 B2 | 5/2012 | Claudatos et al. |
| 9,866,560 B2 | 1/2018 | Margalit et al. |
| 10,257,179 B1* | 4/2019 | Saylor .................. H04W 12/06 |
| 10,452,880 B2* | 10/2019 | Powell ............... G06K 7/10722 |
| 2003/0115481 A1 | 6/2003 | Baird et al. |
| 2004/0093244 A1 | 5/2004 | Hatcher et al. |
| 2012/0209884 A1 | 8/2012 | Mattsson et al. |
| 2018/0025263 A1 | 1/2018 | Toyoizumi et al. |
| 2018/0027018 A1 | 1/2018 | McErlane et al. |
| 2018/0027354 A1* | 1/2018 | Regep |
| 2018/0196960 A1* | 7/2018 | Gullicksen .......... G06F 21/6245 |
| 2018/0248881 A1 | 8/2018 | Mueller et al. |

\* cited by examiner

INFORMATION LINKING SYSTEM WITH GEO-LOCATION MECHANISM AND METHOD OF OPERATION THEREOF

CROSS REFERENCE TO RELATED APPLICATIONS

This application claims the benefit of U.S. Provisional Patent Application Ser. No. 62/463,680 filed Feb. 26, 2017, and the subject matter thereof is incorporated herein by reference thereto.

This application contains subject matter related to U.S. Patent Application Ser. No. 15/905,156 that was concurrently filed on Feb. 26, 2018. The subject matter thereof is incorporated herein by reference thereto.

TECHNICAL FIELD

An embodiment of the present invention relates generally to an information linking system, and more particularly to a system for linking information to geo-location of objects.

BACKGROUND

Cataloging data related to objects of interest has become increasingly important in assigning a value to antique or personal objects. The lineage of objects can be difficult to document over many years or generations. Quite often objects can be discovered in an attic or garage with no information of who purchased or manufactured the object.

In many cases the object can have extraordinary interest to the person that originally acquired the object. If the original owner has passed away, any detailed information including the history of the object can be lost. In some cases, the true value of an object can be enhanced by having historic details about the owner, use, or origin of the object.

Thus, a need still remains for an information linking system with geo-location mechanism to prevent the loss of interesting facts about an object or its owner. In view of the aging population, many personal treasures will be unidentifiable over the next decade. The loss of historic information related to most of the objects can explain how a small painting by Rembrandt can be purchased at a garage sale for five dollars or worse, it could be discarded as junk. Additionally, the need to preserve the culture of an aging society through information about an object of significance adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an information linking system with geo-location mechanism, including: an identification icon instantiated on an object; and a device configured to: scan the identification icon, determine an access key by analyzing the identification icon including a target location read from the identification icon and a current location of the device that scanned the identification icon, and retrieve at least an initial availability level from a plurality of qualified information levels of a geo-location object information and additional information levels, authorized by the access key when the current location is within a geo-fence of the target location, for displaying on the device.

An embodiment of the present invention provides a method including: scanning an identification icon on an object; determining an access key by analyzing the identification icon including a target location read from the identification icon and a current location of a device that scanned the identification icon; and retrieving at least an initial availability level from a plurality of qualified information levels of a geo-location object information and additional information levels, authorized by the access key when the current location is within a geo-fence of the target location, for displaying on the device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
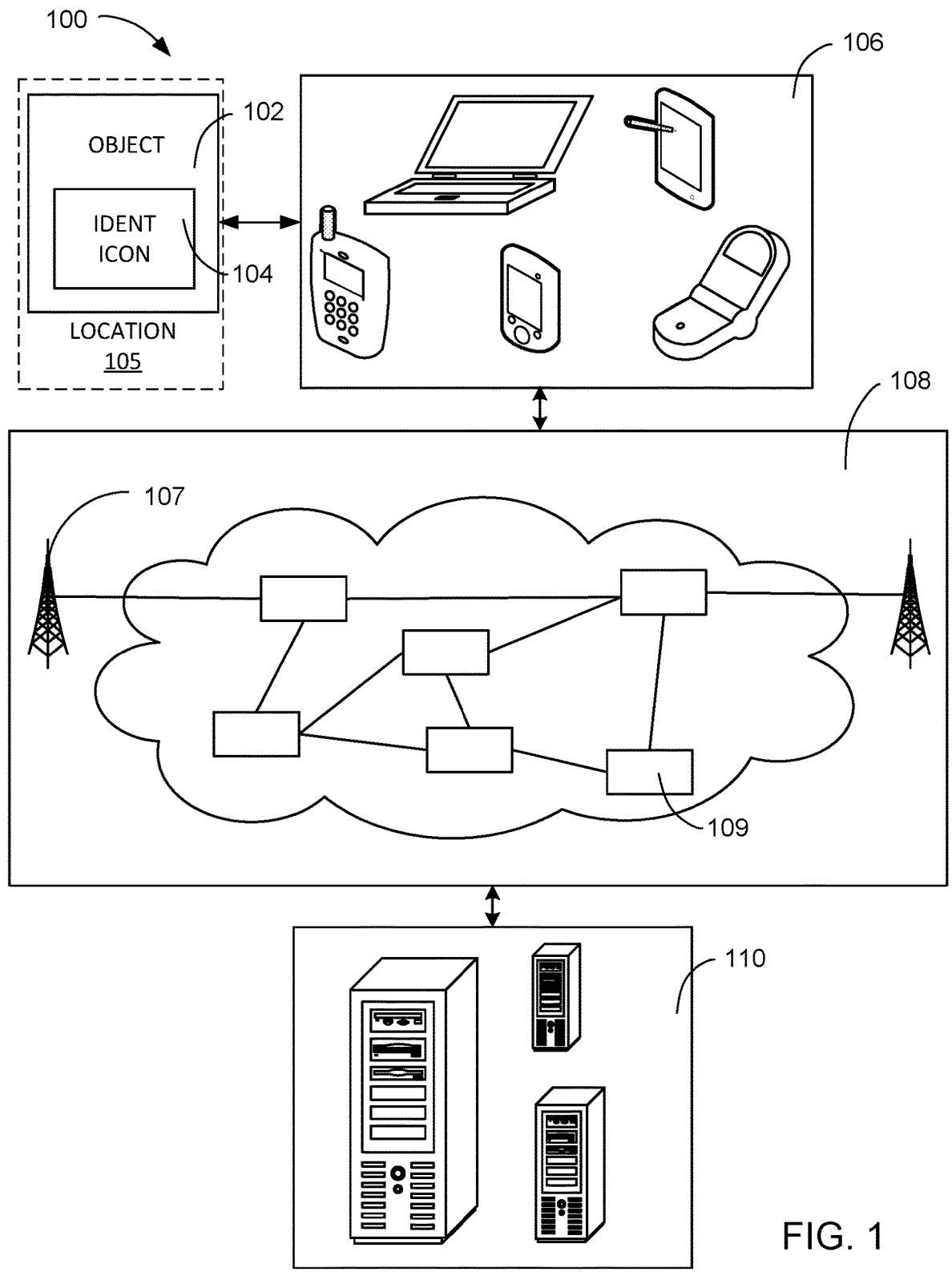
FIG. 1 is an information linking system with geo-location mechanism in an embodiment of the present invention.

An embodiment of the present invention provides a means to store and retrieve supplementary information that is linked to an object of value or interest. The information linking system with geo-location mechanism of the present invention can link text messages, audio messages, video messages, a suggested route, or a combination thereof to the object of personal value or interest. The information linking system can document the manufacturing, acquisition, legal background, medical information, or economic benefit of the object of value or interest. By the addition of a geo-location object information, a digital picture, videos, electronic documents, holograms, or a combination thereof linked to the object of value or interest, the financial benefits of the object of value or interest can be enhanced. The linking of the geo-location object information to the object of value or interest can be achieved by instantiating an identification icon, including a bar code, a quick response (QR) code, a StickEcode, or a combination thereof, on the object of value or interest. The identification icon can be instantiated by means including engraving, stamping, printing, or adhering to the object of value or interest.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "instantiating" referred to herein is defined as installing by means including painting, engraving, inking, printing, adhering, laser engraving, plating, stamping, attaching, or a combination thereof for applying an information icon to an object.

The term "icon" referred to herein can include a two-dimensional image, three-dimensional image, video frame, a computer file representation, an image from a camera, a video frame, or a combination thereof. For example, the image can be a machine readable digital image, a physical photograph, a digital photograph, a motion picture frame, a video frame, an x-ray image, a scanned image, or a combination thereof.

The term "StickEcode" referred to herein can be a graphic identification key that is capable of being instantiated on an object for the purpose of linking supplementary information to the object. The StickEcode can be instantiated by means including printed, adhered, engraved, etched, plated, sprayed, or painted on a surface of the object.

The term "module" referred to herein can include software, hardware, or a combination thereof in an embodiment of the present invention in accordance with the context in which the term is used. For example, the software can be machine code, firmware, embedded code, application software, or a combination thereof that is executed on a hardware platform. Also for example, the hardware platform can be circuitry, processor, computer, integrated circuit, integrated circuit cores, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown an information linking system 100 with geo-location mechanism in an embodiment of the present invention. The information linking system 100 includes an object 102, such as valued object with economic, legal, medical, or geographic information related to the manufacture, acquisition, use, or ownership of the object 102. The object 102 can be instantiated with an identification icon 104, including a label, bar code, a quick response (QR) code, an identifiable pattern, or a combination thereof physically on the object 102. The object 102 can be in a current location 105 identified by a first device 106. The object 102 can be optically linked to the first device 106, such as a client or a server, connected to a second device 110, such as a client or server. The first device 106 can communicate with the second device 110 through a communication source 107 of a communication path 108, such as a wireless or wired network. The communication source 107 can be a cell tower, repeater, communication hub, or a combination thereof.

For example, the first device 106 can be of any of a variety of optical interaction devices, such as a cellular phone, personal digital assistant, a notebook computer, a bar code scanner system, a pattern recognition system, or other multi-functional optical or entertainment device. The first device 106 can couple, either directly or indirectly, to the communication path 108 to communicate with the second device 110 or can be a stand-alone device.

For illustrative purposes, the information linking system 100 is described with the first device 106 as a pattern recognition device, although it is understood that the first device 106 can be different types of devices. For example, the first device 106 can also be a device for processing images or a multi-media device. A multi-media device can be capable of recording or presenting sound, a sequence of streaming images, a video feed, or a combination thereof. As an example, the first device 106 can be a smart phone, a scan tool, a laptop computer, a personal digital assistant, a cellular phone, or a multi-media set.

The second device 110 can be any of a variety of centralized or decentralized computing devices, or video transmission devices. For example, the second device 110 can be a multimedia computer, a laptop computer, a desktop computer, a video game console, grid-computing resources, a virtualized computer resource, a cloud computing resource, routers, switches, peer-to-peer distributed computing devices, a media playback device, a Digital Video Disk (DVD) recorder, a three-dimension enabled DVD player, a recording device, such as a camera or video camera, or a combination thereof. In another example, the second device 110 can be a signal receiver for receiving broadcast or live stream signals, such as a television receiver, a cable box, a satellite dish receiver, or a web enabled device.

The second device 110 can be centralized in a single room, distributed across different rooms, distributed across different geographical locations, or embedded within a telecommunications network. The second device 110 can couple through the communication path 108 to communicate with the first device 106.

For illustrative purposes, the information linking system 100 is described with the second device 110 as a computing device, although it is understood that the second device 110 can be different types of devices. Also for illustrative purposes, the information linking system 100 is shown with the second device 110 and the first device 106 as end points of the communication path 108, although it is understood that the information linking system 100 can have a different partition between object 102, the first device 106, the second device 110, and the communication path 108. For example, the first device 106, the second device 110, or a combination thereof can also function as part of the communication path 108.

The communication path 108 can span and represent a variety of networks and network topologies. For example, the communication path 108 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 108. Ethernet, digital subscriber line (DSL), fiber to the home (FTTH), and plain old telephone service (POTS) are examples of wired communication that can be included in the communication path 108. Further, the communication path 108 can traverse a number of network topologies and distances. For example, the communication path 108 can include direct connection, personal area network (PAN), local area network (LAN), metropolitan area network (MAN), wide area network (WAN), or a combination thereof.

The first device 106 can be optically linked to the object 102 in order to recognize and process the identification icon 104. The identification icon 104 provides a pattern or sequence that identifies and catalogs the object 102 and any supplementary information linked to the object 102. The first device 106 can analyze the identification icon 106 to enforce security and identification functions in order to store or retrieve a geo-location object information 109 associated with the object 102. The geo-location object information 109 can be stored on the second device 110 or the first device 106. The geo-location object information 109 can be a text file, a video file, an audio file, or a combination thereof that can be displayed after verification of the security and identification functions have been processed.

The geo-location object information 109 can include a description of the object's background, an offer for location based services, a personal message recorded by the owner, background information on the use of the object, an estimated value of the object, or a combination thereof. The geo-location object information 109 can include economic information, location based offers, general background information, legal information, medical information, or layered information having secured and unsecured information.

By way of an example, the first device 106 can analyze the identification icon 104 on the object 102 in order to retrieve a pre-recorded instance of the geo-location object information 109 associated with the object 102 through the identification icon 104. The first device 106 can present the geo-location object information 109 retrieved from the second device 110 or stored locally within the first device 106. An information access function can block retrieval of a portion of the geo-location object information 109 by preventing the complete analysis of the identification icon 104 by the first device 106. In some embodiments only the generally available portion of the geo-location object information 109 is retrieved when the information access function is not satisfied.

By way of an example, the geo-location object information 109 can include an announcement of an economic opportunity, a beneficial service, an award, an entertainment opportunity, a security alert, notification of the object 102 being away from its intended location, or a combination thereof related to the object 102, which can have text, audio, video, or a combination thereof. The geo-location object information 109 can provide geo-location information for valuables, antiques, pets, or location limits of the object 102. By providing the geo-location object information 109, the object 102 that is an advertisement of economic award or discount, can direct the user of the first device 106 to a location that allows additional information to be delivered on how to exercise the award or discount.

By way of another example, the object 102 can be a birthday invitation and the geo-location object information 109 can include a description of the party theme, a suggested route to the party location, a present wish list, or a combination thereof. The geo-location object information 109 can include text, audio, or video related to the description of the birthday party.

By way of another example, the object 102 can be an invitation to a scavenger hunt and by scanning the identification icon 104, the geo-location object information 109 can provide a suggested route to the closest item in the scavenger hunt. Once in proximity to the closest item in the scavenger hunt, scanning the identification icon 104 a second time can give specific details about finding and acquiring the closest item. An additional scan of the identification icon 104 can provide a suggested route to the next closest item in the scavenger hunt, and so on.

By way of yet another example the object 102 can be a medallion on a pets collar and the identification icon 104 can be scanned to identify the pet. If the pet's medallion is scanned outside the area where the pet resides, the geo-location object information 109 can provide ownership details, owner's address and contact information, the name of the veterinarian that cares for the pet, or the like.

Figure 2:
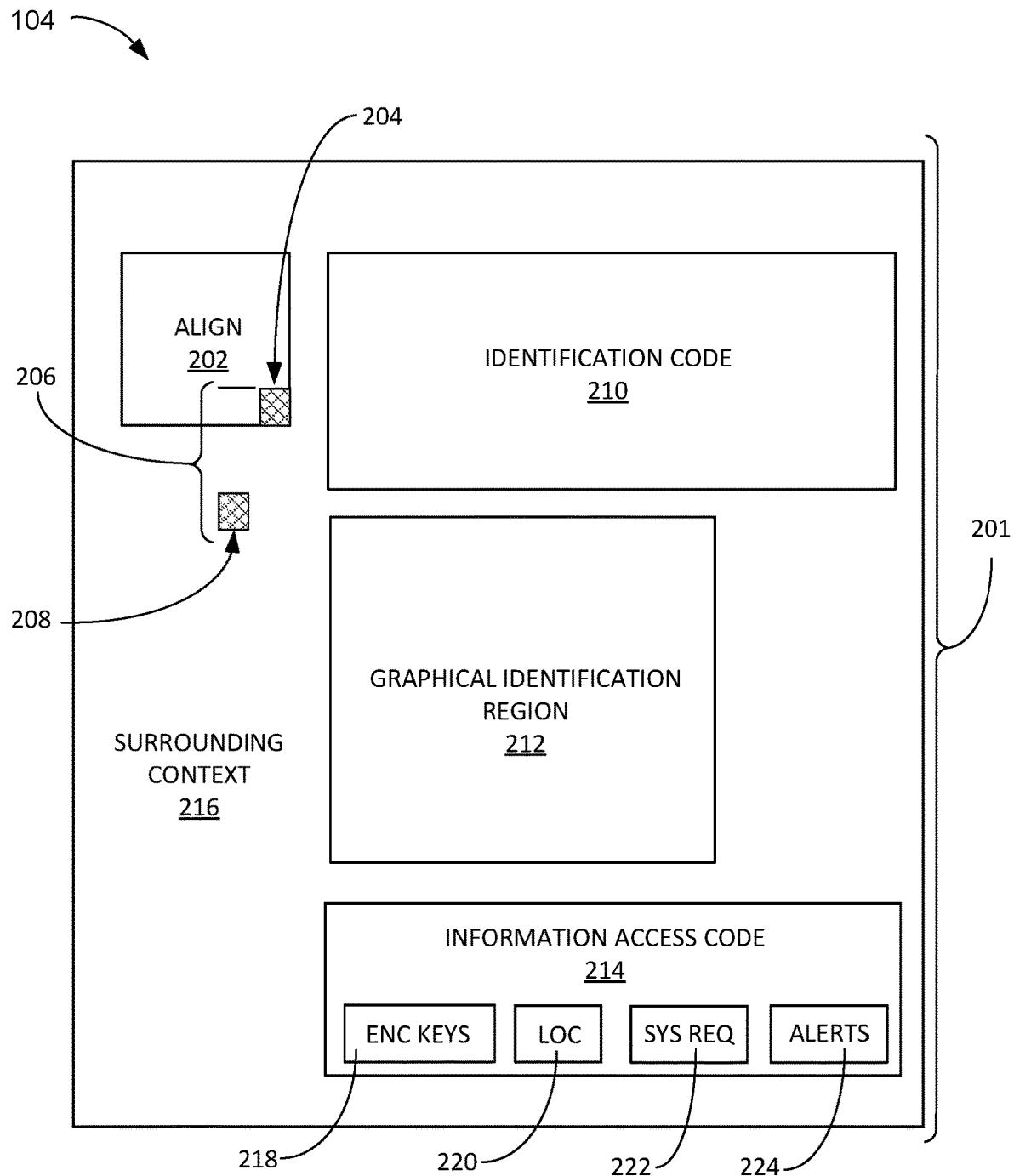
FIG. 2 is a functional block diagram of an identification icon in an example embodiment.

Referring now to FIG. 2, therein is shown a functional block diagram of an identification icon 104 in an example embodiment. The functional block diagram of the identification icon 104 can be displayed having a rectangular shape, but this is for example only and other shapes can be supported.

The identification icon 104 can include raw icon data 201 including an alignment structure 202, an identification code 210, a graphical identification region 212, an information access code 214, and a surrounding context code 216. While the identification icon 104 is shown having distinct boundaries between the alignment structure 202, the identification code 210, the graphical identification region 212, the information access code 214, and the surrounding context code 216, it is understood that these functions can be interspersed within the context of the identification icon 104.

The alignment structure 202 can include a single structure or multiple structures used to define an initial position 204 and sequence of the identification code 210, the graphical identification region 212, the information access code 214, and the surrounding context code 216. The alignment structure 202 can include one or more rectangular shapes, one or more circular shapes with cross-hairs, defining the columns and rows of the identification icon 104, or other shapes for defining alignment on the identification icon 104.

The information access code 214 can be a field used to specify criteria for accessing the geo-location object information including encryption keys 218, target location 220, system requirements 222, alerts 224, or a combination thereof. The information access code 214 can be used by the first device 106 and the second device 110 to protect the contents of the geo-location object information 109 from compromised access. The target location 220, the alerts 224 can notify the second device 110 if the identification icon 104 is not in the proper geographical location as determined by the first device 106. The encryption keys 218 can be used to maintain the confidential nature of the levels of the geo-location object information 109 not generally available.

It is understood that the complete analysis of the identification icon 104 can require an icon analysis module in the first device 106 of FIG. 1, the second device 110 of FIG. 1, or the combination thereof. An unsecured partial analysis of the identification icon 104 can provide basic non-confidential information about the object 102 of FIG. 1. The unsecured partial analysis can be accessed by using the first device 106 without the icon analysis module activated or present. The unsecured partial analysis can access a first layer of the geo-location object information 109, which is viewable by anyone that can scan the identification icon 104.

The identification code 210 can include a digital code, a bar code, a pattern recognition code, a color density code, or a combination thereof. The identification code 210 can provide the information required to identify the geo-location object information 109 associated with the identification icon 104. The complete analysis of the identification code 210 can require information from the graphical identification region 212, the information access code 214, and the surrounding context code 216. It is understood that the analysis of the identification code 210 can be modified by the information provided by the combination of the graphical identification region 212, the information access code 214, and the surrounding context code 216.

In an example embodiment, the first device 106 can define an offset 206 that is loaded when the geo-location object information 109 is initiated. The offset 206 can define an offset initial position 208, which can redefine the locations of the combination of the graphical identification region 212, the information access code 214, and the surrounding context code 216. The offset 206 can provide a displacement from the alignment structure 202 to define a new location as the offset initial position 208, which can change the physical alignment and access different information from the graphical identification region 212, the information access code 214, the surrounding context code 216, or the combination thereof. It is understood that the offset 206 can be defined as a radial distance, a horizontal distance, a vertical distance, or a combination thereof.

The graphical identification region 212 can include a logo, crest, coded pattern, a varying density pattern, a bar code, a photograph, or a combination thereof. By way of an example, the graphical identification region 212 can be an indicator of the owner, the sponsor, the service provider, the manufacturer of the object, or a combination thereof. The graphical identification region 212 can limit the type of data provided by the geo-location object information 109. The graphical identification region 212 can indicate that authorization can be required to access additional information about the object 102 beyond general initially available information. The graphical identification region 212 can be an indicator that other levels of hidden information are available to be disclosed and presented on the first device 106 only with pre-authorization.

The information access code 214 can provide additional levels of distinction for the geo-location object information 109. In some cases, the information access code 214 can prevent any disclosure of information from analysis of the identification icon 104 or it can enable disclosure of information to a selected level of authorization. By way of an example, the information access code 214 can allow the first device 106 to display information on the manufacture of the object 102, but prevent disclosure of ownership information. In other cases, the information access code 214 can allow disclosure of levels of the geo-location object information 109 that would be of interest to the user of the first device 106 that is accessing the information from the object 102.

The surrounding context code 216 can act as a qualifier to verify the authenticity of the graphical identification region 212 and the information access code 214. The surrounding context code 216 can provide an error correction basis for the identification code 210, the graphical identification region 212 and the information access code 214. In an embodiment, the information access code 214 can be previously loaded into the first device 106. When the identification icon 104 is implemented the information access code 214 can be omitted, which would require the information access code 214 in the first device to be verified in order to allow the display of the geo-location object information 109. In this way the object 102 which is available for public display can have the identification icon 104 generally available, but the qualified levels of the geo-location object information 109 can have limited access by authorized individuals only.

By way of an example, the object 102 can be an antique desk that is insured against theft. The identification icon 104 can be prominent on the object 102. Analysis of the identification icon 104 can indicate layered information enabled by the first device interpreting the identification code 210, the graphical identification region 212, the information access code 214, and the surrounding context code 216. Analysis of the identification icon 104, without full authorization, can provide general information about the antique desk, while a full authorization can provide a video of the antique desk at the time the insurance was acquired, as represented on various levels of the geo-location object information 109. The target location 220 can be compared to the current location of the first device 106 and any mismatch can trigger an action as identified by the alerts 224. This can include reporting the current location of the object 102 to the insurance company that is insuring the antique desk.

The identification icon 104 can be attached to, engraved on, printed on, plated on, or adhered to the object 102. The geo-location object information 109 can be generated in association with the generation of the identification icon 104. Based on the information level defined by the identification icon 104, an appropriate portion of the geo-location object information 109 can be displayed on the first device 106. It is understood that different levels of the geo-location object information 109 can be accessed based on the information level determined by the first device 106 and the second device 110 processing the identification icon 104.

It is understood that portions of the identification code 210, the graphical identification region 212, the information access code 214, and the surrounding context code 216 can be read or extracted and provided to the first device 106 as a mask or overlay that compliments the remaining portions of the identification icon 104. This feature can provide additional security by requiring the overlay to complete the information needed to fully access the geo-location object information 109. In an application where the identification icon 104 can be scanned in successive locations, the geo-location object information 109 can provide a next value of the target location 220 as an overlay to the first device 106. The subsequent scan of the identification icon 104 would use the overlay of the target location 220 rather than the value originally read from the information access code 214.

It has been discovered that the combination and variations of the identification code 210, the graphical identification region 212, the information access code 214, and the surrounding context code 216 can support any number of levels within the geo-location object information 109. The initial base level of the geo-location object information 109 can be displayed without any interpretation by the first device 106 or any other device capable of scanning optical coded information. Access to any of the remaining levels can be determined by the first device 106 processing the identification code 210, the graphical identification region 212, the information access code 214, and the surrounding context code 216.

Figure 3:
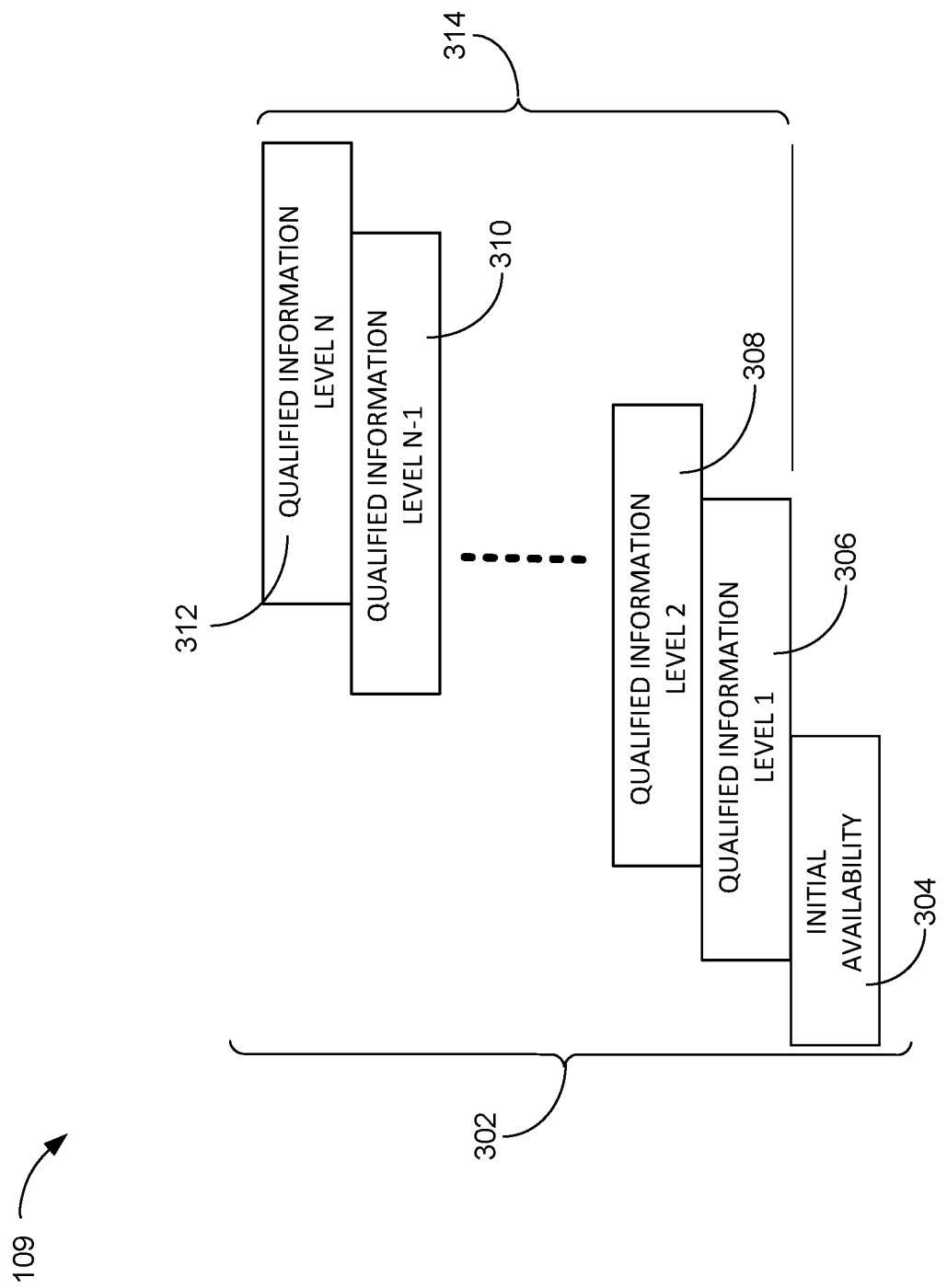
FIG. 3 is an architectural block diagram of a geo-location object information in an example embodiment.

Referring now to FIG. 3, therein is shown an architectural block diagram of a geo-location object information 109 in an example embodiment. The geo-location object information 109 can provide a plurality of qualified information levels 302. An initial availability level 304 can be scanned and displayed by any device that is capable of interpreting an optical code, such as a bar code, a QR code, a StickEcode, or a combination thereof, such as the first device 106 of FIG. 1.

A first qualified information level 306 can be accessed based on a specific combination of the identification code 210 of FIG. 2, the graphical identification region 212 of FIG. 2, the information access code 214 of FIG. 2, and the surrounding context code 216 of FIG. 2 interpreted by the first device 106 using the icon analysis module. It is understood that the first qualified information level 306 can add additional information or context to the initial availability level 304. The information access code 214 can indicate that a specific geo-location is required to access the next level in the plurality of qualified information levels 302 or that a mis-match in the target location 220 and the current location as determined by the first device 106 can trigger alert actions as defined in the plurality of qualified information levels 302.

The plurality of qualified information levels 302 can be contain geographical data, genetic information, medical history data, confidential or legal information, direction or routing information, or the like. By way of an example, the identification icon 104 of FIG. 1 can be instantiated on a legal document, such as a deed of ownership of land. The plurality of qualified information levels 302 can include a map of the property, legal description of the property, surveyor's notes on the property, development plans for the property, and the like with each level requiring some pre-authorization to allow access.

By way of another example, the identification icon 104 can be instantiated on medical medallion and the plurality of qualified information levels 302 can include emergency contact information, medical history data, a list of prescriptions, a list of doctors with contact information, genetic information, insurance information, or the like. Access to any of the data that is confidential can be protected by the encryption key 218 of FIG. 2 and can require pre-authorization to access the plurality of qualified information levels 302.

By way of another example, the identification icon 104 can be instantiated on the object 102, such as a car. The initial availability level 304, of the geo-location object information 109, can provide basic information about the object 102. Keeping with the example, the initial availability level 304 can include the manufacturer information, model, features list, or other information of a public nature. The first device 106 operating the icon analysis module can access the initial availability level 304 and any of a first qualified information level 306, a second qualified information level 308, an N-$1^{st}$ qualified information level 310, an N$^{th}$ qualified information level 312, any intervening information levels (not shown), or a combination thereof that are authorized for the first device 106. The first qualified information level 306, the second qualified information level 308, the N-$1^{st}$ qualified information level 310, the N$^{th}$ qualified information level 312, any intervening information levels are defined as additional information levels 314 that are only available to certain users identified through the first device 106.

Keeping to the above example, the first qualified information level 306 can present the name of the original owner, date of purchase, registered address of the object 102, or a combination thereof presented as a text list or document. The second qualified information level 308 can provide context information about the purchase of the object, such as a video or photograph of the original owner taking possession of the object 102. The intervening information levels (not shown) can provide additional legal or financial information about the object 102. The N-$1^{st}$ qualified information level 310 can provide additional context, such as a current maintenance record the object 102, the restoration of the object 102, a new paint job for the object 102, or the like. The N$^{th}$ qualified information level 312 can provide additional contextual information, such as an accident record for the object 102, or the like.

The first device 106 can scan different regions of the identification icon 104 of FIG. 1 in order to locate the identification code 210, the graphical identification region 212, the information access code 214, and the surrounding context code 216 that are enabled for the first device 106 by shifting the initial position 204 defined by the alignment structure 202 of FIG. 2 by an offset 206 of FIG. 2. The shifting of the initial position 204 from the alignment structure 202 can redefine the area of the identification code 210, the graphical identification region 212, the information access code 214, and the surrounding context code 216. The first device 106 can utilize the icon analysis module to scan the alignment structure 202 and apply an offset direction and distance based on which of the plurality of qualified information levels 302 the first device 106 is allowed to access only the plurality of qualified information levels 302 authorized by the access level of the first device 106 and present to a user.

It is understood that the shifting of the initial position 204 from the alignment structure 202 can alter a scan location, scan frequency, scan distance, or a combination thereof within the identification icon 104. By changing the scan location, scan frequency, or scan distance of the identification code 210, the graphical identification region 212, the information access code 214, and the surrounding context code 216, the access of each of the plurality of qualified information levels 302 by the first device 106 can be selectively enabled. If any or all of the plurality of qualified information levels 302 are allowed access, the first device 106 can use multiple successive scans using different initial positions 204 offset from the alignment structure 202 for each level within the plurality of qualified information levels 302. By altering the initial position 204, the scan location, scan frequency, scan distance of the identification code 210, the graphical identification region 212, the information access code 214, and the surrounding context code 216, or the combination thereof, the first device 106 that does not have the icon analysis module can only access the initial availability level 304 because the identification code 210, the graphical identification region 212, the information access code 214, and the surrounding context code 216 for additional levels of the geo-location object information 109 cannot be located or interpreted correctly.

It is understood that the identification code 210, the graphical identification region 212, the information access code 214, or the combination thereof can be used to define the initial position 204, scan frequencies, scan location, scan distances, or the combination thereof. It has been discovered that the first device 106 can scan the identification icon 104 to extract information to access any number of the levels of the geo-location object information 109, authorized for the first device 106, based on the initial position 204, scan frequencies, scan location, scan distances, or the combination thereof. Any offsets to the initial position 204 can be loaded when the geo-location object information 09 is initialized. Any instance of the first device 106 that is intended to view portions of the geo-location object information 109 can receive parameters for establishing the initial position 204 when the geo-location object information 109 is initialized.

Figure 4:
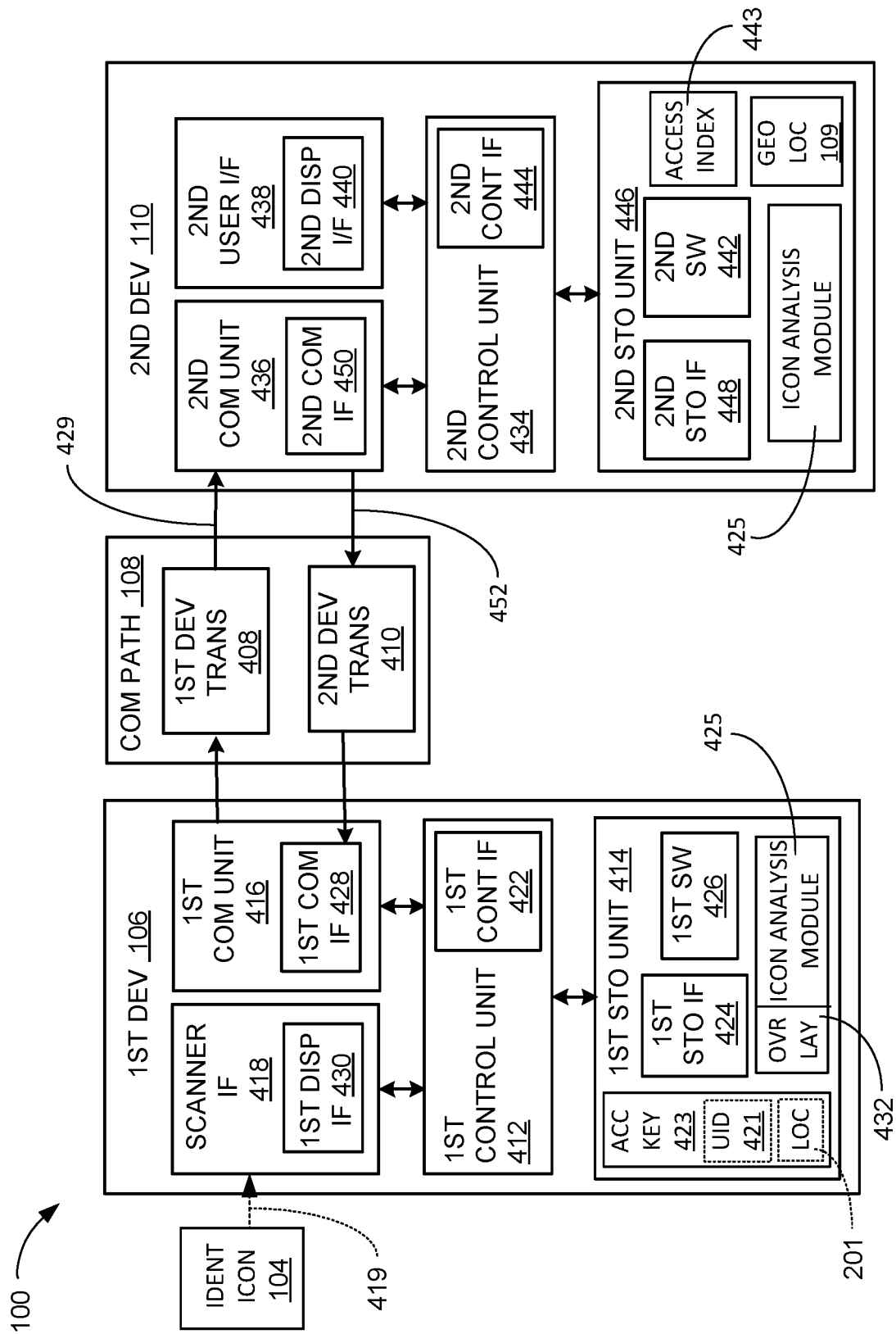
FIG. 4 is an exemplary block diagram of the linking system with geo-location mechanism.

Referring now to FIG. 4, therein is shown an exemplary block diagram of the information linking system 100. The information linking system 100 can include the first device 106, the communication path 108, and the second device 110. The first device 106 can send information in a first device transmission 408 over the communication path 108 to the second device 110. The second device 110 can send information in a second device transmission 410 over the communication path 108 to the first device 106.

For illustrative purposes, the information linking system 100 is shown with the first device 106 as a client device, although it is understood that the information linking system 100 can have the first device 106 as a different type of device. For example, the first device 106 can be a server having a scan and a display interface.

Also for illustrative purposes, the information linking system 100 is shown with the second device 110 as a server, although it is understood that the information linking system 100 can have the second device 110 as a different type of device. For example, the second device 110 can be a client device.

For brevity of description in this embodiment of the information linking system 100, the first device 106 will be described as a client device and the second device 110 will be described as a server device. The embodiment of the information linking system 100 is not limited to this selection for the type of devices. The selection is an example of an embodiment of the information linking system 100.

The first device 106 can include a first control unit 412, a first storage unit 414, a first communication unit 416, and a scanner interface 418. The first control unit 412 can include a first control interface 422. The first control unit 412 can execute a first software 426 to provide the intelligence for the first device 106 and an icon analysis module 425 to support additional capabilities of the information linking system 100 including scanning and analyzing the information icon 104 of FIG. 1. The icon analysis module 425 can provide the ability to redefine the initial position 204 of FIG. 2 from the alignment structure 202 of FIG. 2 in order to access the authorized levels of the plurality of qualified information levels 302.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 106. The first control interface 422 can also be used for communication that is external to the first device 106.

The first control interface 422 can receive information from the other functional units or from external sources, or can transmit information to the other functional units or to external destinations. The external sources and the external destinations refer to sources and destinations external to the first device 106.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the geo-location object information 109, such as data accessible in response to a scan of the identification icon 104, data representing previously saved images, sound files, or a combination thereof. The first storage unit 414 can maintain access overlays 432 to compliment the identification icon 104 that has access updates from the combination of the graphical identification region 212 of FIG. 2, the information access code 214 of FIG. 2, and the surrounding context code 216 of FIG. 2 based on the identification code 210 of FIG. 2.

The access overlays 432 are a set of substitution fields that can allow the update or modification of elements of the identification icon 104 including the encryption keys 218, the target location 220, the system requirements 222, the alerts 224, or a combination thereof. It is understood that the access overlays 432 can alter the operation and potential destination of the information linking system 100 operated on the first device 106 and the second device 110. The access overlays 432 can be updated by actions defined in the geo-location object information 109.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between and other functional units in the first device 106. The first storage interface 424 can also be used for communication that is external to the first device 106.

The first storage interface 424 can receive information from the other functional units or from external sources, or can transmit information to the other functional units or to external destinations. The external sources and the external destinations refer to sources and destinations external to the first device 106.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 106. For example, the first communication unit 416 can permit the first device 106 to communicate with the second device 110 of FIG. 1, an attachment, such as a peripheral device or a computer desktop, and the communication path 108. The first communication unit 416 can also provide the current location 105, of FIG. 1, of the first device 106 through a global positioning system (GPS) or triangulation among the communication sources 107, of FIG. 1, of the communication path 108.

The first communication unit 416 can also function as a communication hub allowing the first device 106 to function as part of the communication path 108 and not limited to be an end point or terminal unit to the communication path 108. The first communication unit 416 can include active and passive components, such as microelectronics, a global positioning system (GPS), an antenna, or a combination thereof, for interaction with the communication path 108.

The first communication unit 416 can include a first communication interface 428. The first communication interface 428 can be used for communication between the first communication unit 416 and other functional units in the first device 106. The first communication interface 428 can receive information from the other functional units or can transmit information to the other functional units. The icon analysis module 425 can transform scanned information 419 of the identification icon 104 into an icon information request 429 for the geo-location object information 109 that is presented to the first communication interface 428 by the first control unit 412.

The first communication interface 428 can include different implementations depending on which functional units are being interfaced with the first communication unit 416. The first communication interface 428 can be implemented with technologies and techniques similar to the implementation of the first control interface 422.

The scanner interface 418 allows a user (not shown) to interface and interact with the first device 106. The scanner interface 418 can include an input device and an output device. Examples of the input device of the scanner interface 418 can include a keypad, a touchpad, soft-keys, a keyboard, a microphone, a camera, an infrared sensor for receiving remote signals, an optical scanner, or any combination thereof to provide data and communication inputs. The scanner interface 418 can scan the identification icon 104 on the object 102 of FIG. 1 in order to analyze the identification icon 104. The first control unit 412 can access the icon analysis module 425 in order to analyze the scanned information 419 from the identification icon 104.

In an example embodiment, the access to the geo-location object information 109 can be assigned by the originator of the geo-location object information 109. An access index 443, can be hardware and software for maintaining the access assignment can be associated with the geo-location object information 109, that can identify who or what devices can access the information in the geo-location object information 109. It is understood the access index 443 and the geo-location object information 109 can be maintained in the first device 106 or the second device 110. It is understood that the access index 443 can be a register array, memory, or a combination thereof that can hold the requirements for accessing the geo-location object information 109 by the first device 106.

The scanner interface 418 can scan the identification icon 104 and the first control processor 412 can submit the scanned information 419 to the icon analysis module 425 in order to identify the geo-location object information 109 to be accessed. The first control processor 412 can transfer an access key 423, provided by the icon analysis module 425, which includes the interpretation of the scanned information 419 from the identification icon 104 including applying the access overlay 432, the current location 105 of the first device 106, and a unit identification number 421. The access key 423 can identify which of the plurality of qualified information levels 302 of FIG. 3 are authorized for display on the first device 106. The access key 423 can authorize at least the initial availability level 304 as well as any of the additional information levels 314 appropriate for the first device 106.

The unit identification number 421 can be assigned to the first device 106, when the icon analysis module 425 was installed, and can represent a unique identifier, such as a symbol, number, or list of characters, which can uniquely identify the first device 106. The scanned information 419 can be the raw icon data 201 of FIG. 2, contained in the identification icon 104, including the identification code 210, the graphical identification region 212, the information access code 214, the surrounding context code 216 or the combination thereof.

The scanner interface 418 can include a first display interface 430. The first display interface 430 can include a display, a projector, a video screen, a speaker, or any combination thereof. The first display interface 430 can provide a display of the authorized levels of the plurality of qualified information levels 302 of the geo-location object information 109 appropriate for the access index 443.

The first control unit 412 can operate the scanner interface 418 to display information generated by the information linking system 100. The first control unit 412 can also execute the first software 426 for the other functions of the first device 106. The first control unit 412 can also execute the icon analysis module 425 in order to perform the operations of the information linking system 100 including analyzing the scanned information 419 from the identification icon 104. The first control unit 412 can further execute the first software 426 for interaction with the communication path 108 via the first communication unit 416. The first control unit 412 can transfer the access key 423 through the communication path 108 in order to identify the current location 105 of the first device 106 and retrieve the plurality of qualified information levels 302 enabled by the access index 443.

The second device 110 can be optimized for implementing an embodiment of the information linking system 100 in a multiple device embodiment with the first device 106. The second device 110 can provide the additional or higher performance processing power compared to the first device 106. The second device 110 can include a second control unit 434, a second communication unit 436, and a second user interface 438.

The second user interface 438 allows a user (not shown) to interface and interact with the second device 110. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 110 of the information linking system 100. The second software 442 can operate in conjunction with the first software 426 in order to store and retrieve the geo-location object information 109 that can be identified by the identification code 210 of the identification icon 104. The second control unit 434 can provide additional performance compared to the first control unit 412.

The second control unit 434 can operate the second user interface 438 to display information. The second control unit 434 can also execute the second software 442, for the other functions, as well as the icon analysis module 425 of the information linking system 100, including operating the second communication unit 436 to communicate with the first device 106 over the communication path 108.

The second control unit 434 can be implemented in a number of different manners. For example, the second control unit 434 can be a processor core, an embedded processor, a microprocessor, hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 110. The second controller interface 444 can also be used for communication that is external to the second device 110.

The second controller interface 444 can receive information from the other functional units or from external sources, or can transmit information to the other functional units or to external destinations. The external sources and the external destinations refer to sources and destinations external to the second device 110.

The second controller interface 444 can be implemented in different ways and can include different implementations depending on which functional units or external units are being interfaced with the second controller interface 444. For example, the second controller interface 444 can be implemented with a microelectromechanical system (MEMS), optical circuitry, waveguides, wireless circuitry, wireline circuitry, or a combination thereof.

A second storage unit 446 can store the second software 442. The second storage unit 446 can also store the data representing the geo-location object information 109 including data representing the plurality of qualified information levels 302 of FIG. 3 such as previously stored images, videos, sound files, text, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the information linking system 100 is shown with the second storage unit 446 as a single hierarchy storage system, although it is understood that the information linking system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between other functional units in the second device 110. The second storage interface 448 can also be used for communication that is external to the second device 110.

The second storage interface 448 can receive information from the other functional units or from external sources, or can transmit information to the other functional units or to external destinations. The external sources and the external destinations refer to sources and destinations external to the second device 110.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 110. For example, the second communication unit 436 can permit the second device 110 to communicate with the first device 106 over the communication path 108.

The second communication unit 436 can also function as a communication hub allowing the second device 110 to function as part of the communication path 108 and not limited to be an end point or terminal unit to the communication path 108. The second communication unit 436 can include active and passive components, such as microelectronics or an antenna, for interaction with the communication path 108.

The second communication unit 436 can include a second communication interface 450. The second communication interface 450 can be used for communication between the second communication unit 436 and other functional units in the second device 110. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 108 to send information to the second device 110 in a first device transmission 408 with the icon information request 429 for the geo-location object information 109, including the current location 105 of the first device 106, the access key 423, raw icon data 201 including the access overlay 432, or a combination thereof. The second device 110 can receive icon information request 429 in the second communication unit 436 from the first device transmission 408 of the communication path 108. The second control unit 434 can access the icon analysis module 425 to determine which of the plurality of qualified information levels 302 of FIG. 3 can be returned to the first device 106.

The second control unit 434 can review the icon information request 429 and compare the access key 423 by searching the contents of the access index 443 in order to determine which of the plurality of qualified information levels 302 can be transferred to the first device 106. Any access key 423 that is not included in the access index 443 is sent the initial availability level 304. The second control unit 434 can access the geo-location object information 109 to retrieve the plurality of qualified information levels 302 of FIG. 3 that are authorized for the first device 106. The second control unit 434 can assemble an icon information response 452 that includes any updates to the access overlay 432 and only the information levels enabled for transfer by the icon analysis module 425.

The second communication unit 436 can couple with the communication path 108 to send the icon information response 452 to the first device 106 in a second device transmission 410. The first device 106 can receive the icon information response 452, including any of the plurality of the selective information levels 302 enabled by the icon analysis module 425 as indicated by the access index 443 and any updates to the access overlay 432. The processes of the information linking system 100 can be executed by the first control unit 412, the second control unit 434, or a combination thereof. It is understood that the first control unit 412 or the second control unit 434 must execute the icon analysis module 425 when processing the icon information request 429 and the icon information response 452.

For illustrative purposes, the second device 110 is shown with the partition having the second user interface 438, the second storage unit 446, the second control unit 434, and the second communication unit 436, although it is understood that the second device 110 can have a different partition. For example, the second software 442 can be partitioned differently such that some or all of its function can be in the second control unit 434 and the second communication unit 436. Also, the second device 110 can include other functional units not shown in FIG. 4 for clarity.

The functional units in the first device 106 can work individually and independently of the other functional units. The first device 106 can work individually and independently from the second device 110 and the communication path 108.

The functional units in the second device 110 can work individually and independently of the other functional units. The second device 110 can work individually and independently from the first device 106 and the communication path 108.

For illustrative purposes, the information linking system 100 is described by operation of the first device 106 and the second device 110. It is understood that the first device 106 and the second device 110 can operate any of the modules and functions of the information linking system 100.

In an example embodiment, the first software 426 or the second software 442 can access the icon analysis module 425 in order to process the access key 423 and then identify the geo-location object information 109. The access key 423 can be in the form of the icon information request 429 for display of any of the plurality of qualified information levels 302 within the geo-location object information 109 enabled by the access index 443. Any of the first device 106 having a unit identification number 421 that is not listed in the access index 443 can only access the initial availability level 304.

The second control unit 434 can process the access key 423 with the icon analysis module 425 and the access index 443 in order to determine which of the plurality of the selective information layers 302 of the geo-location object information 109 should be included in the icon information response 452 to the first device 106. In an example embodiment, the access key 423 can be from the first device 106 with the unit identification number 421 found in the access index 443 to be enabled for the initial availability level 304 of FIG. 3 and the second information level 308 FIG. 3. It is understood that requests from the first device 106 having a different value of the unit identification number 421 can be enabled for any or all of the plurality of qualified information levels 302 in combination or just the initial availability level 304. Any of the first device 106 having the unit identification number 421 that is not included in the access index 443 is only enabled to receive the initial availability level 304. The first device 106 can display the plurality of the selective information layers 302 of the geo-location object information 109 transmitted in the icon information response 452.

It is understood that the user of the first device 106 can scan the identification icon 104 in order to retrieve and display any of the plurality of qualified information levels 302 enabled for display on that particular instance of the first device 106. The identification icon 104 instantiated on the object 102 can be complemented by access overlays 432 present in or accessed by the icon analysis module 425 in order to retrieve different levels of information from the geo-location object information 109. The plurality of qualified information levels 302 can be available in a layered structure that can be controlled by the access index 443 associated with the identification icon 104 in combination with any of the access overlays 432. It is understood that there can be several instances of the first device 106 in the hands of different users. The Access index 443 can identify which of the first device 106 is enabled for any or all of the plurality of the selective information layers 302 based on the access key 423 incorporated in the icon information request 429.

Figure 5:
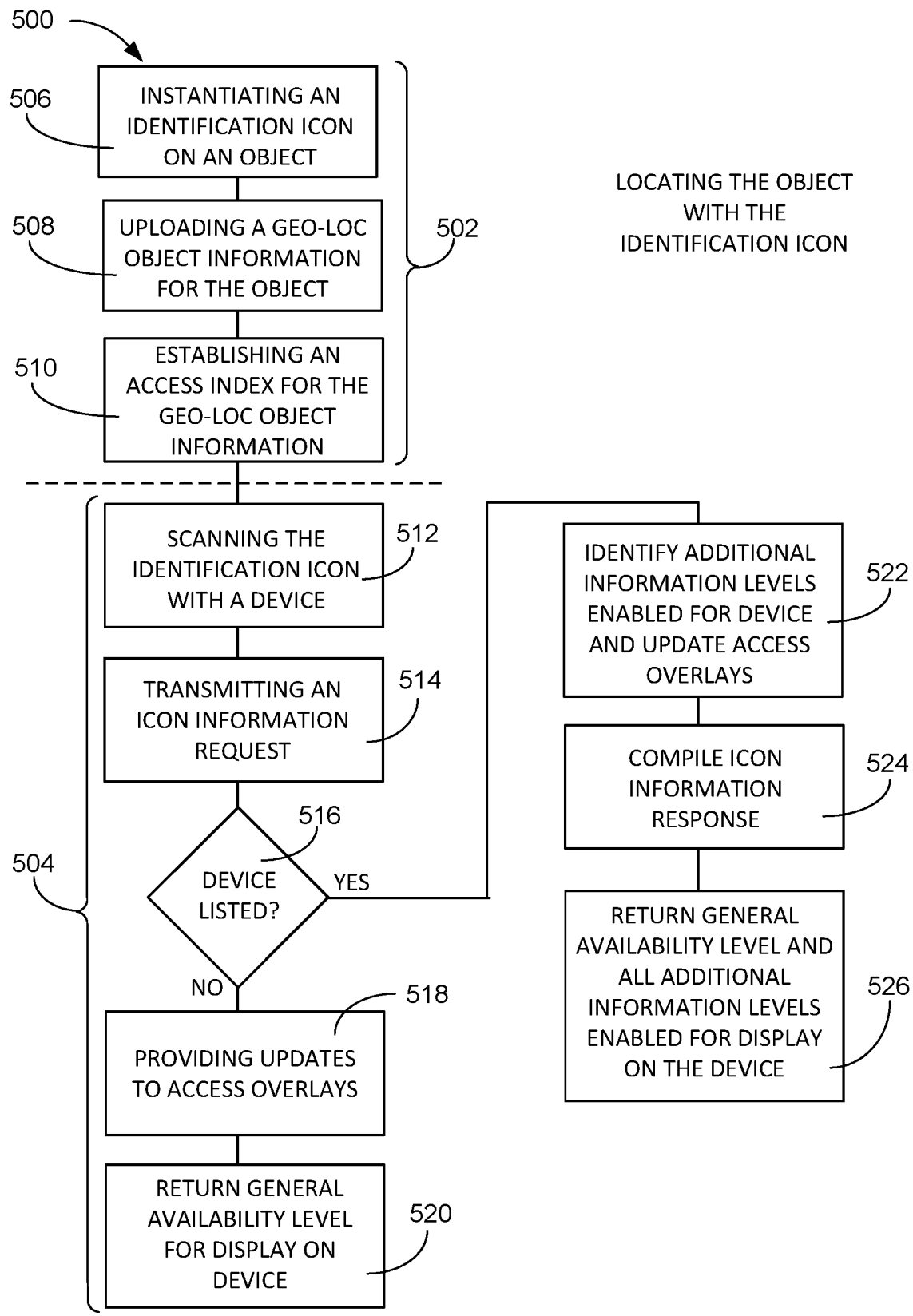
FIG. 5 is an operational flow chart of an information linking system with geo-location mechanism in an embodiment of the present invention.

Referring now to FIG. 5, therein is shown an operational flow chart of an information linking system 500 in an embodiment of the present invention. The operational flow chart of the information linking system 500 depicts an initialization portion 502 and an execution portion 504.

The initialization portion 502 can include instantiating an identification icon 104 of FIG. 1 on an object 102 of FIG. 1 in a block 506. The process of instantiating the identification icon 104 can vary depending on what type of the object 102 is to be identified. The user that instantiated the identification icon 104 would then upload a geo-location object information 109 of FIG. 1 for the object 102 in a block 508. It is understood that the geo-location object information 109 can include the plurality of qualified information levels 302 of FIG. 3 provided by the user to provide information about the object 102. The user can then control how the plurality of qualified information levels 302 can be viewed. Establishing an access index 443 of FIG. 4 for the geo-location object information 109 in a block 510. It is understood that the access index 443 can contain the unit identification number 421 of the devices 106 that can have access to each of the plurality of qualified information levels 302 in the geo-location object information 109. In some embodiments, the plurality of qualified information levels 302 can be sequentially available to any of the first device 106 without regard for the unit identification number 421 of the devices 106. This completes the initialization portion 502 and the information linking system 500 can be operational.

After the initialization portion 502 has been completed the execution portion 504 can be available for use. The execution portion 504 can be operated by any user that has the first device 106. It is understood that not all of the first device 106 can access the additional information levels 314 of the geo-location object information 109, but any of the first device 106 can access the initial availability level 304 of the geo-location object information 109.

The execution portion 540 can start by scanning the identification icon 104 with the first device 106 in a block 512. It is understood that the first device 106 can be any device that can scan the identification icon 104 and display the enabled result of the scan.

The first device 106 can be used for transmitting the icon information request 429 in a block 514. The first device 106 might not have the icon analysis module 425 of FIG. 4, but another application could request data form scanning the information icon 109. It is also understood that the first device 106 that does have the icon analysis module 425 might not be allowed to view the additional information levels 314 of the geo-location object information 109, but any of the first device 106 can access the initial availability level 304 of the geo-location object information 109. An analysis of the icon information request 429 can determine whether the first device 106 is listed in the access index 443 or not in a decision block 516.

If the first device 106 is not listed in the access index 443, the information linking system 500 can provide updates to the access overlays 432 in a block 518 and return the initial availability level 304 and the updates to the access overlays 432 for display on the first device 106 in a block 520. If the first device 106 is listed in the access index 443, the information linking system 500 can identify the additional information levels 314 and the updates to the access overlays 432 enabled for the first device 106 in a block 522.

For any of the additional information levels 314 enabled for the first device 106, the information linking system 500 can compile the icon information response 452 of FIG. 4 in a block 524. It is understood that the information linking system 500 can include any of the additional information levels 314 enabled for the first device 106 along with the initial availability level 304 in the icon information response 452.

The information linking system 500 can return the initial availability level 304 and all of the additional information levels 314 that are enabled for display on the first device 106 in a block 526. The display of the initial availability level 304 and the additional information levels 314 can convey privileged information related to the object 102 or in some cases the user that performed the initialization portion 502.

It is understood that the privileged information of the additional information levels 314 can be encrypted based on an encryption key related to the unit identification number 421 provided in the access key 423 of the icon information request 429. It has been discovered that the information linking system 500 can provide access to the additional information levels 314 of the geo-location object information 109 while maintaining the confidentiality as intended by the user that completed the initialization portion 502.

Figure 6:
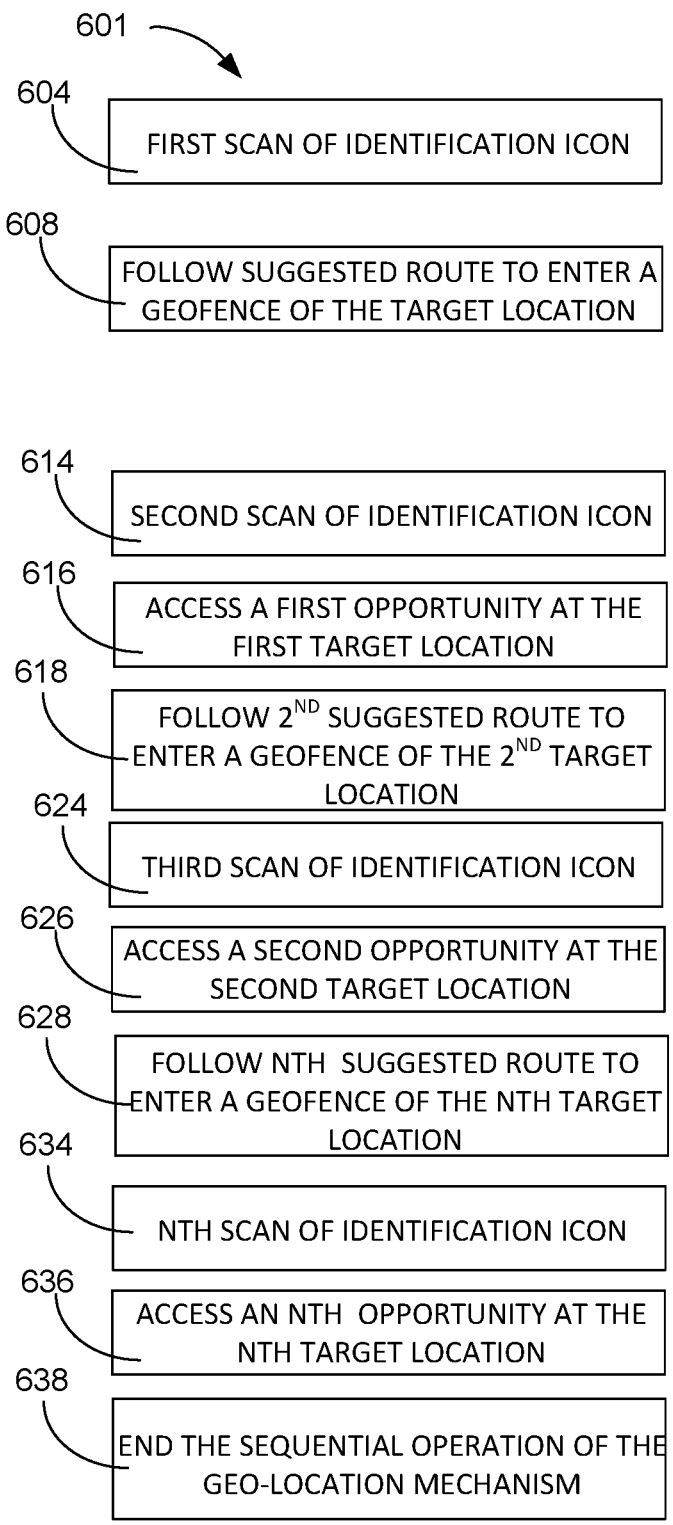
FIG. 6 is an exemplary flow diagram of an information linking system with geo-location mechanism in an embodiment of the present invention.
Figure 6:
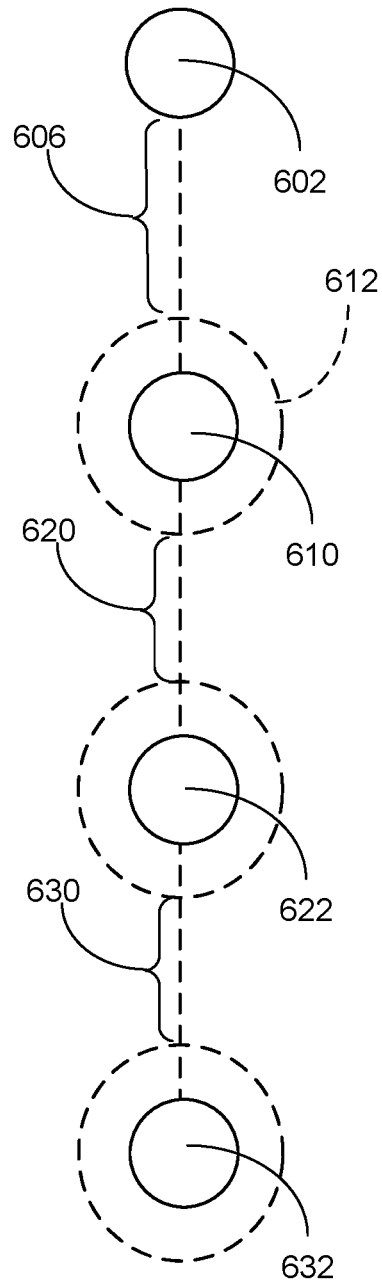

Referring now to FIG. 6, therein is shown an exemplary flow diagram of a sequential operation 601 of the information linking system 100 with geo-location mechanism in an embodiment of the present invention. The exemplary flow 601 diagram of the information linking system 100 depicts an initial location 602 of the first device 106 of FIG. 1. A user of the first device 106 can receive an object 102 of FIG. 1 with an identification icon 104. The first device 106 can be used to perform a first scan 604 of the identification icon 104. By scanning the identification icon 104, the information linking system 100 can read the target location 220 of FIG. 2 and determine the current location 105 of FIG. 1. The icon information request 429 of FIG. 4 can include the access key 423 of FIG. 4 to access the geo-location object information 109 that is enabled by the access index 443 of FIG. 4.

In an embodiment, the second device 110 of FIG. 1 can log the unit identification number 421 of FIG. 4 for subsequent accesses. The second device 110 can execute the icon analysis module 425 in order to formulate the icon information response 452 of FIG. 4 including transferring the initial availability level 304 of FIG. 3. In an example application, the icon analysis module 425 can respond with a first suggested route 606 and a first instruction frame 608, which can instruct the user of the first device 106 to travel to a first target location 610, as specified in the target location 220 of the information access code 214 of FIG. 2. The first target location 610 can include a geo-fence 612 that surrounds the first target location 610. The geo-fence is a location based perimeter around the target location 220. The geo-fence 612 can be defined by the icon analysis module 425, based on the general availability level 304, to be any shape around the target location 220. By way of an example, the geo-fence 612 is shown in a circular shape, but the geo-fence 612 can be any shape.

Upon arrival at the first target location 610, a second instruction frame 614 can instruct the user of the first device 106 to perform a second scan of the identification icon 104. When the first device 106 scans the identification icon 104, the first device can determine that the first device 106 is within the geo-fence 612 of the first target location 610. The information linking system 100 can deliver instructions to access a first opportunity 616 at the first target location 610. The first opportunity 616 can include locating a scavenger hunt item, purchasing an item at a discount, sign-up for a contest entry, log a time of accessing the first opportunity, or a combination thereof.

The information linking system 100 can access the first qualified information level 306 of FIG. 3 in order to formulate the icon information response 452 including an update of the target location 220 provided as the access overlay 432 to the first device 106. The first device 106 can also display second instruction frame 618 providing a second suggested route 620 for travelling to a second target location 622, as detailed in the first qualified information level 306. Upon arrival at the second target location 622, a third scan 624 of the identification icon 104 can detect that the first device 106 is within the geo-fence 612 of the second target location 622. The information linking system 100 can access the second qualified information level 308 of FIG. 3 in order to formulate the information icon response 452 including an update of the target location 220 provided as the access overlay 432 to the first device 106.

The icon information response 452 can include the update of the target location 220 provided as the access overlay 432 to the first device 106 as well as instructions to access a second opportunity 626 at the second target location 622. The second opportunity 626 can include locating a scavenger hunt item, purchasing an item at a discount, sign-up for a contest entry, log a time of accessing the first opportunity, or a combination thereof.

The process can be repeated until the $N-1^{st}$ qualified information level 310 of FIG. 3 is accessed in order to formulate the icon information response 452 including an update of the target location 220 provided as the access overlay 432 to the first device 106. The icon information response 452 can include the update of the target location 220 provided as the access overlay 432 to the first device 106 as well as instructions to access an $N^{th}$ opportunity 636 at the $N^{th}$ target location 622. The $N^{th}$ opportunity 636 can include locating a scavenger hunt item, purchasing an item at a discount, sign-up for a contest entry, log a time of accessing the first opportunity, completion of a step in a step-by-step instruction, or a combination thereof.

The icon information response 452 can allow the first device 106 to display an $N^{th}$ suggested route 630 to arrive at the $N^{th}$ target location 632. When the first device 106 arrives within the geo-fence 612 of the $N^{th}$ target location 632, the first device 106 can display instructions to perform the $N^{th}$ scan 634 of the identification icon 104. The icon information request 429 generated by the $N^{th}$ scan 634 can indicate that the first device is within the geo-fence 612 of the $N^{th}$ target location 632. The information linking system 100 can access the $N^{th}$ qualified information level 312 of FIG. 3 in order to formulate the icon information response 452 for the first device 106. The first device 106 can display an instruction to access the $N^{th}$ opportunity 636 and announce an end 638 of the sequential operation 601 of the geo-location mechanism of the information linking system 100.

It has been discovered that the information linking system 100 can provide a flexible mechanism that can utilize the geo-location of the first device 106 in order to unlock opportunities defined in the plurality of qualified information levels 302. When the target location 220 read from identification icon 104 does not match the current location 105 of the first device 106, the second device 110 can provide a suggested route 606 to get the first device 106 within the geo-fence 612 of the target location 220. When the target location 220 does match the current location 105, the second device 110 can access the next one of the additional information levels 314 of FIG. 3.

It has also been discovered that the information linking system 100 can provide an alert, as defined by the alerts 224 of FIG. 2 of the information access code 214 of FIG. 2. The plurality of qualified information levels 302 can be configured to transmit the alerts 224 when the first device 106 is able to scan the identification icon 104 and the target location 220 does not match the current location 105. The alerts 224 can be transmitted based on the additional information levels 314 that are enabled by the access index 443, while the initial availability level 304 is returned to the first device 106. The alerts 224 can notify authorities of the object 102 with the data from the geo-location object information 109 including descriptions, ownership information, and the current location 105 of the first device 106.

It is understood that the information linking system 100 with geo-location mechanism can be used in an entertainment device, advertising mechanism, competition monitor, instruction mechanism, location alert mechanism, or a combination thereof. By transforming the information icon 104 into discrete instructional steps, the information linking system 100 can be used as a step-by-step instruction delivery system, a travel itinerary delivery mechanism, a security check point schedule verification mechanism, a gaming system, a location based alarm system, a pet location mechanism, or a competition timing mechanism. The use of the access overlays 432 can cause the user of the first device 106 to move through a series of locations as determined by access overlays 432 substituted for the target location 220.

Figure 7:
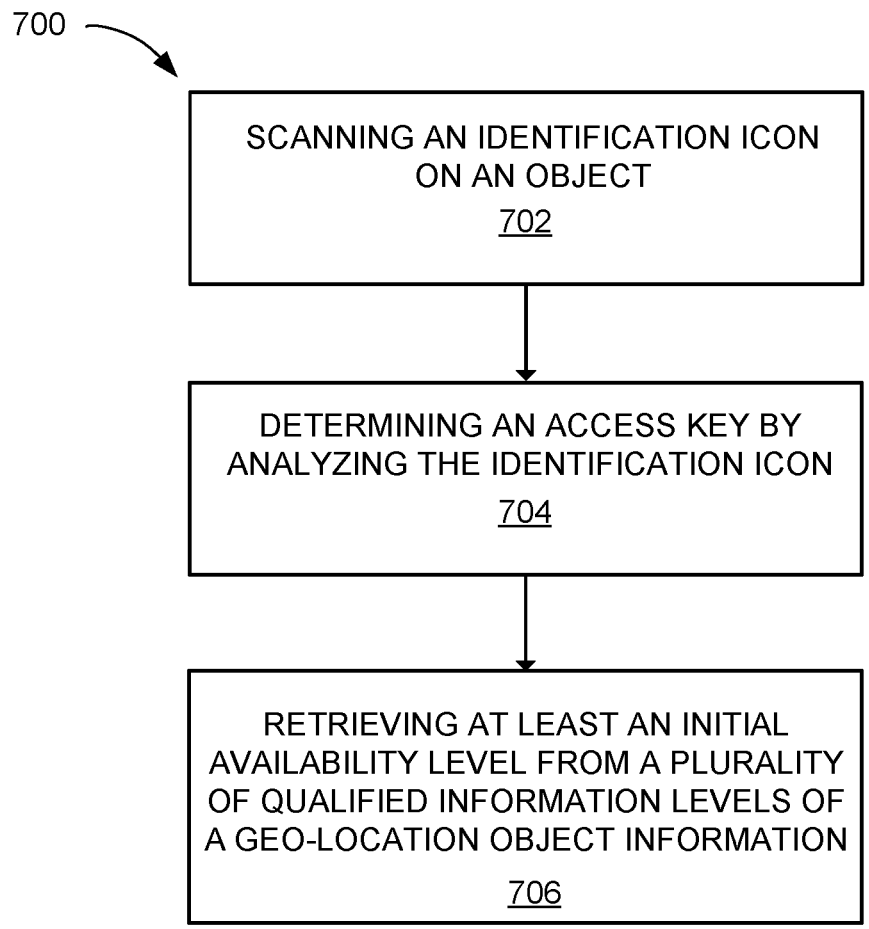
FIG. 7 is a flow chart of a method of operation of an information linking system with geo-location mechanism in a further embodiment of the present invention.

Referring now to FIG. 7, therein is shown a flow chart of a method 700 of operation of an information linking system 100 in an embodiment of the present invention. The method 700 includes: scanning the identification icon by a device in a block 702; determining an access key by analyzing the identification icon including a target location read from the identification icon and a current location of a device that scanned the identification icon in a block 704; and retrieving at least an initial availability level from a plurality of qualified information levels of an geo-location object information and additional information levels, authorized by the access key when the current location is within a geo-fence of the target location, for displaying on the device in a block 706.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of an information linking system comprising:
    scanning optically coded information from an identification icon on an object;
    locating an alignment structure, in the optically coded information, for locating an identification code, a graphical identification region, an information access code, and a surrounding context code on the identification icon;
    determining an access key by analyzing the identification code, the graphical identification region, the information access code, and the surrounding context code including a target location read from the identification icon and a current location of a device, that scanned the identification icon, provided by a positioning system; and
    retrieving at least an initial availability level from a plurality of qualified information levels of a geo-location object information and additional information levels, authorized by the access key when the current location is within a geo-fence of the target location, for displaying on the device, wherein the initial availability level includes the optically coded information, about the object, displayed without restriction.

2. The method as claimed claim 1 wherein determining the access key includes processing scanned information, the current location, and a unit identification number.

3. The method as claimed in claim 1 wherein retrieving at least the initial availability level from the plurality of qualified information levels includes:
    searching an access index to determine which of the plurality of qualified information levels are enabled including comparing the current location and the target location;
    assembling an icon information response including the initial availability level and the additional information levels that are enabled in the access index; and
    transferring the icon information response to the device.

4. The method as claimed in claim 1 wherein scanning the identification icon includes:
    determining an initial position from the alignment structure; and
    reading the contents of the identification code, the graphical identification region, the information access code, and the surrounding context.

5. The method as claimed in claim 1 wherein retrieving at least the initial availability level from the plurality of qualified information levels of the geo-location object information includes appending any of a first qualified information level, a second information level, an N−1st information level, an Nth information level, or a combination thereof with the initial availability level as determined by an access index.

6. The method as claimed in claim 1 further comprising searching an access index linked to the geo-location object information for defining which of the initial availability level, a first qualified information level, a second qualified information level, an N−1st qualified information level, an Nth qualified information level, or a combination thereof are enabled for transfer to the device.

7. The method as claimed in claim 1 wherein scanning the identification icon includes:

defining an offset initial position by applying an offset from the alignment structure; and analyzing the content of the identification code, the graphical identification region, the information access code, and the surrounding context based on the offset initial position.

8. The method as claimed in claim 1 wherein scanning the identification icon includes:

optically reading the identification icon for producing scanned information;

processing the scanned information, the current location, and a unit identification number by an icon analysis module for determining the access key including comparing the current location and the target location; and generating an icon information request including the access key.

9. The method as claimed in claim 1 wherein retrieving at least an initial availability level for displaying on the device includes presenting an icon information response, including a suggested route, the target location, and a geo-fence, on a display interface of the device.

10. The method as claimed in claim 1 wherein retrieving the additional information levels includes identifying an encryption key for decoding a first qualified information level, a second qualified information level, an N−1st qualified information level, an Nth qualified information level, or a combination thereof enabled for transfer to the device.

11. An information linking system comprising:

an identification icon instantiated on an object; and a device, optically coupled to the identification icon, configured to:

scan optically coded information from the identification icon, locate an alignment structure, in the optically coded information, for locating an identification code, a graphical identification region, an information access code, and a surrounding context code on the identification icon;

determine an access key by analyzing the identification icon including a target location read from the identification code, the graphical identification region, the information access code, and the surrounding context code and a current location of the device, that scanned the identification icon, provided by a positioning system, and retrieve at least an initial availability level from a plurality of qualified information levels of an geo-location object information and additional information levels, authorized by the access key when the current location is within a geo-fence of the target location, for displaying on the device, wherein the initial availability level includes the optically coded information, about the object, displayed without restriction.

12. The system as claimed in claim 11 wherein the device configured to determine the access key includes providing scanned information, the current location, and a unit identification number to an icon analysis module.

13. The system as claimed in claim 11 wherein the device configured to retrieve at least the initial availability level from the plurality of qualified information levels of the geo-location object information includes:

a control unit configured to:

search an access index searched to determine which of the plurality of qualified information levels are enabled including comparing the current location and the target location, assemble an icon information response received including any of the plurality of qualified information levels that are enabled for transfer to the device; and a communication unit, coupled to the control unit, configured to transfer the icon information response to the device.

14. The system as claimed in claim 11 wherein the device configured to scan the identification icon includes:

a scanner interface configured to optically read the identification icon;

a control unit, coupled to the scanner interface, configured to determine:

an initial position determined from the alignment structure; and the identification code, the graphical identification region, the information access code, and the surrounding context read by the scanner interface.

15. The system as claimed in claim 11 wherein the device configured to retrieve at least the initial availability level from the plurality of qualified information levels of the geo-location object information includes a communication unit configured to receive any of a first qualified information level, a second qualified information level, an N−1st qualified information level, an Nth qualified information level, or a combination thereof appended with the initial availability level as determined by an access index.

16. The system as claimed in claim 11 wherein the device configured to scan the identification icon includes:

a scanner interface to read the identification code; and a control unit configured to identify an access index linked to the geo-location object information for defining which of the initial availability level, a first qualified information level, a second qualified information level, an N−1st qualified information level, an Nth qualified information level, or a combination thereof are enabled for transfer to the device.

17. The system as claimed in claim 11 wherein the device configured to scan the identification icon includes:

a scanner interface configured identify the alignment structure on the identification icon; and a control unit configured to:

define an offset initial position defined by applying an offset from the alignment structure; and read the identification code, the graphical identification region, the information access code, and the surrounding context read based on the offset initial position.

18. The system as claimed in claim 11 wherein the device configured to scan the identification includes:

a scanner interface configured to optically read the identification icon for producing scanned information;

a control unit, coupled to the scanner interface configured to:

process the scanned information by an icon analysis module for determining the access key including comparing the current location and the target location; and generate an icon information request including the access key.

19. The system as claimed in claim 11 wherein the device is configured to retrieve at least an initial availability level for displaying on the device includes:

a communication interface configured to receive an icon information response; and a display interface configured to present contents of the icon information response including a suggested route, the target location, and a geo-fence.

20. The system as claimed in claim 11 wherein the device configured to retrieve additional information levels authorized by the access key includes a control unit configured to identify an encryption key for decoding a first qualified information level, a second qualified information level, an N−1st qualified information level, an Nth qualified information level, or a combination thereof enabled for transfer to the device.

* * * * *